INVENTOR
PERRY G. MEANS

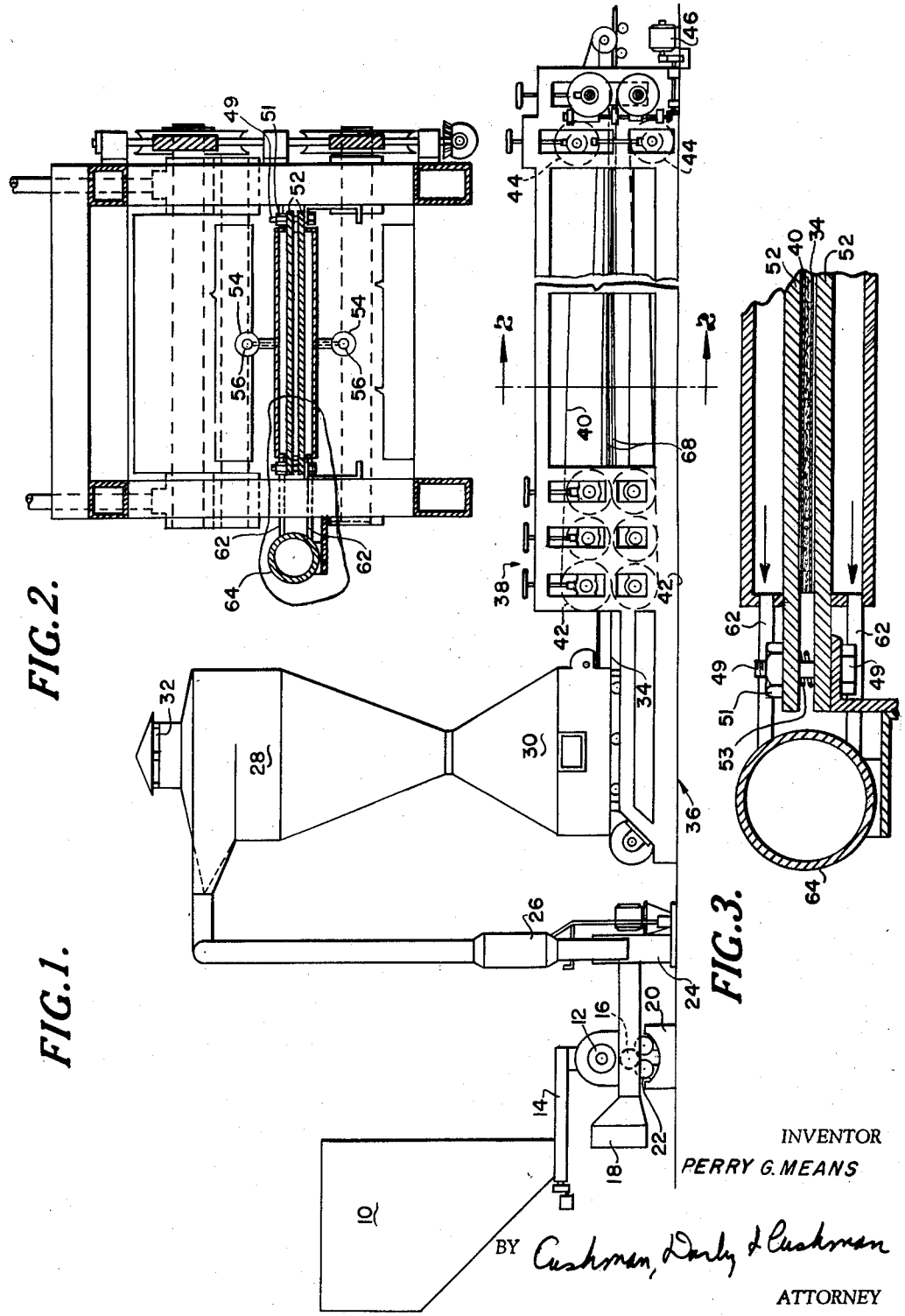

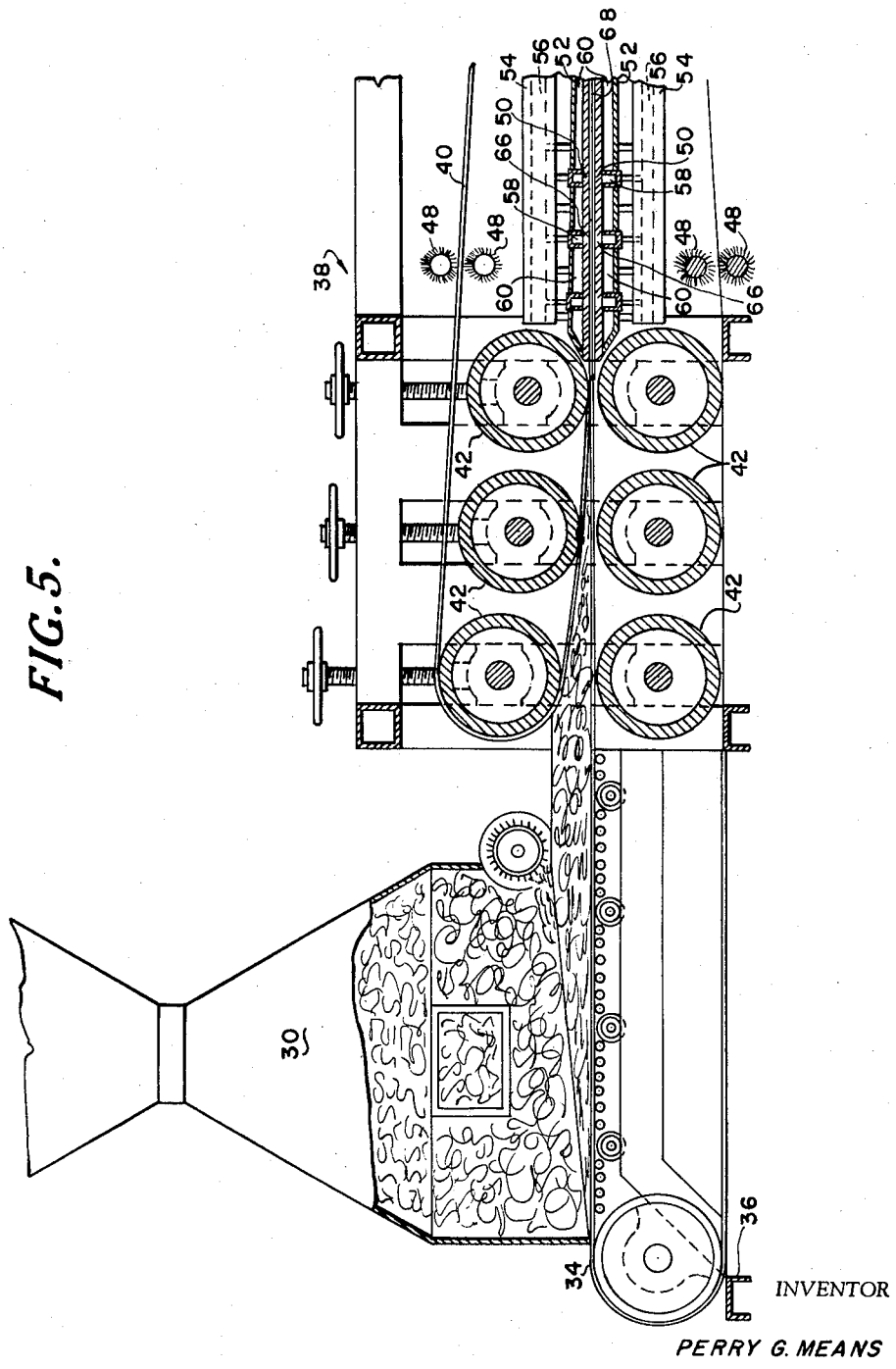

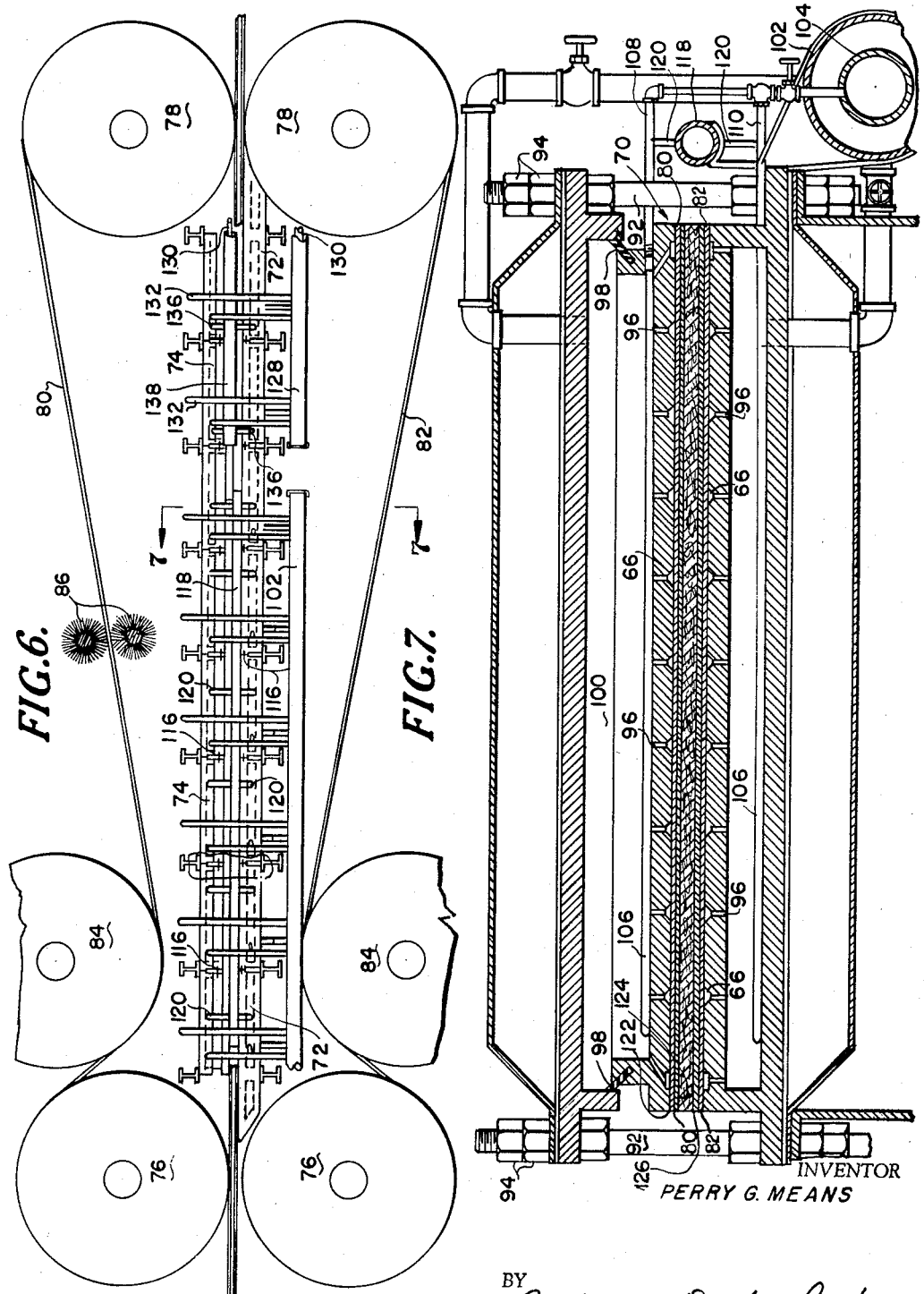

United States Patent Office 2,909,804
Patented Oct. 27, 1959

---

2,909,804

CONTINUOUS HOT PRESSING MACHINE FOR THE MANUFACTURE OF COMPRESSED BOARDS

Perry G. Means, Coos Bay, Oreg.

Application September 16, 1955, Serial No. 534,740

7 Claims. (Cl. 18—4)

The present invention relates to improvements in continuous pressing machines used in the production of sheet lumber products such as fiber board and plywood. More particularly, this invention concerns improvements in means for reducing the friction between the exposed endless belts forming the pressing chamber and the pressure applying platens, as well as to improvements in the structure of the platens per se.

The manufacture of the type of lumber products mentioned above has, in the past, presented a number of perplexing engineering difficulties. Of those relating to the method of manufacturing sheet lumber products, that of moisture content in the finished product is one of the most troublesome. If the moisture content is too low, the product lacks necessary strength and consequently must be subjected to expensive dampening operations after its removal from the manufacturing apparatus whereas, if the moisture content is unduly high, a great amount of steam is generated within the product during its passage through the apparatus, and causes the product to warp or expand upon release therefrom.

In the production of sheet lumber products, such as plywood and fiber board, it is necessary that the material be subjected to relatively high pressures and temperatures during its formation. In most cases in the manufacture of plywood the material is pressed between the platens of a stationary, intermittently operated, multiple opening hot press, but in some cases, and particularly in the manufacture of fiber board, the pressing has been accomplished by sending the material continuously through a press containing opposed sets of endless belts which are backed with a series of platens to exert pressure and heat thereon. With this arrangement, it is apparent that objectionable friction develops between the stationary platens and the moving belts, unless antifriction rollers or the like are provided. The present invention relates to improvements in continuous presses, as distinguished from intermittent presses.

In the production of high quality plywoods one of the essentials is that a good bond exist between the several members. The prevailing method of accomplishing this bonding is to apply a strong waterproof glue to the sheets and then apply pressure to insure proper contact between the plies. It will be readily appreciated that if uniform pressure is not exerted on the sheet, areas will exist where the plies are not rigidly connected thereby giving rise to a finished sheet having an irregular, warped surface. The problem of achieving a perfect union is particularly troublesome where the pressure is applied by means of a continuous press, as opposed to an intermittently operating multiple opening hot press. Up to the present time, the most usual method of exerting pressure in a continuous press has been by means of a series of opposed rollers, acting as backing up rollers for pressure applying belts, through which the multi-layer board is forced.

It is, therefore, one of the primary objects of the invention to provide an apparatus in which the moisture content of the finished sheet lumber product can be accurately predetermined and in which the moistening step following the pressing step is eliminated.

It is still another object of the invention to provide an apparatus for producing sheet lumber products free of warpage and uncontrolled expansion.

Yet another object of the invention is the provision of a press structure capable of exerting uniform pressure on the material passing therethrough.

A further object of the invention is the provision of apparatus wherein friction between the platens and travelling belts is at a minimum.

A still further object of the invention is the provision of a platen structure which will conform readily to irregular surfaces.

An additional object of the invention is to provide means whereby ligneous waste materials or vegetable fibers can be quickly and economically formed into usable sheet lumber products.

Other objects and advantages of the present apparatus will be in part obvious and in part explained by the specification and drawings in which:

Figure 1 is a side elevational view of an endless pressing machine used for the production of pressed fiber board with a section of the pressing chamber removed;

Figure 2 is a sectional view taken along the line 2—2 of Figure 1;

Figure 3 is an enlarged fragmentary view of the encircled area of Figure 2;

Figure 5 is an enlarged vertical longitudinal section of the entrance end of the apparatus of Figure 1;

Figure 6 is a fragmentary side elevation of a modified form of the press shown in Figure 1, this form to be used as a plywood press;

Figure 7 is a sectional view taken along the line 7—7 of Figure 6; and

In one phase of the present process, various ligneous materials, such as planing and/or saw mill waste of any wood, or, fibrous vegetables such as shredded grain straw or corn stalks is run through a pulping machine and then dried to reduce the moisture content to within predetermined desired limits. The dried fibers are then treated with a liquid binder, for example, urea or phenol-formaldehyde synthetic resins with extenders and felted to form a mat, the mat then being subjected to both heat and pressure to form it into a more integral unit.

Figure 4:
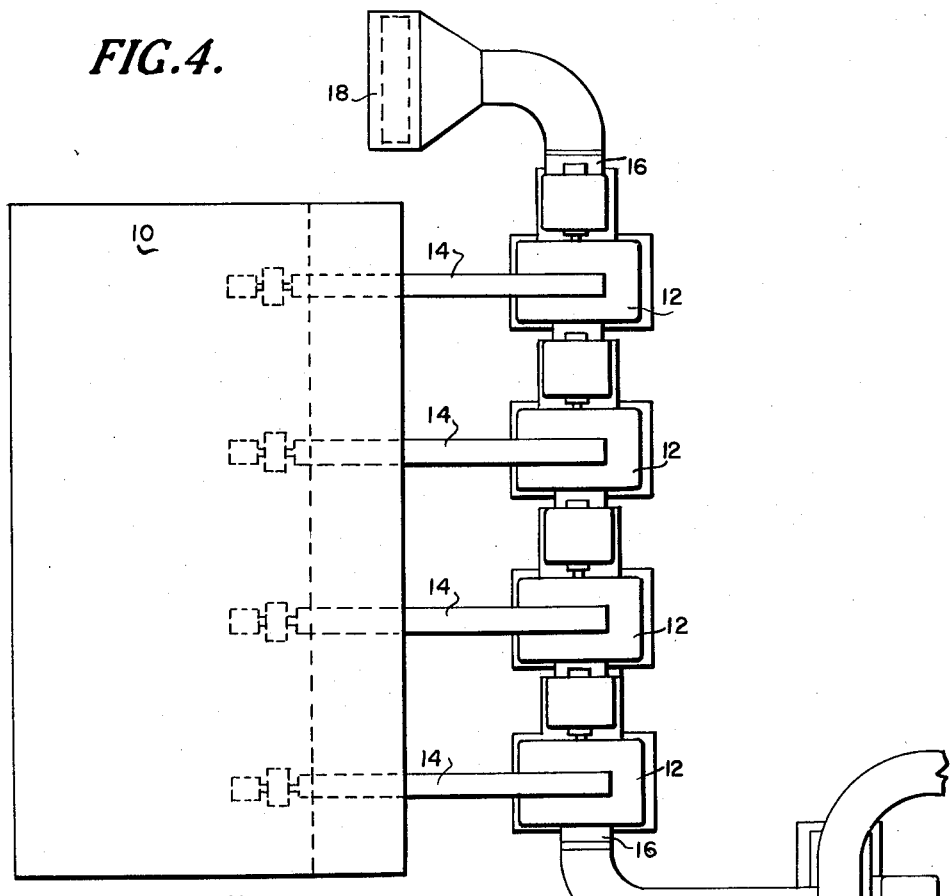
Figure 4 is a fragmentary top plan view of the apparatus up to the cyclone separator.

Referring to Figures 1 and 4 which illustrate a preferred embodiment of the apparatus used in carrying out the process for the production of fiber board outlined previously, numeral 10 indicates a plurality of hoppers into which the raw material is charged. This material, which may be any of the various ligneous products mentioned earlier, i.e., lumber mill wastes or vegetable fibers, is then fed from the hoppers into pulpers 12 by means of any type of suitable feeding mechanism 14; screw conveyors being used in this instance. After pulping, the now fibrous material is injected into a rotary type dryer 16 and treated with a blast of hot, dry air, passing from heater 18, to reduce the moisture content. Dryer 16 is rotatably mounted upon a support 20 having roller mountings 22. In the dryer, which also has a tendency to fluff the fiber, the moisture content is preferably lowered to approximately 10 to 12%, although this may vary depending upon the percentage of moisture desired in the final product.

From the rotary dryer, the collected hot fibers enter a mixer 24 through a measuring pump (not shown), and are sprayed with a resin binder. Liquid urea or phenol-formaldehyde synthetic resins with extenders are suitable as bonding materials.

From the resinating chamber 26 the material flows, by means of a gaseous stream, into a cyclone separator 28 and falls into felting chamber 30 as the hot gasses are exhausted through opening 32 at the top of the cyclone separator 28.

Positioned below the belting chamber is the lower continuous steel belt 34 and extension 36 of the press that is used to compress the fibers, the press being indicated generally by numeral 38. Once the material is deposited upon lower belt 34, it advances through the mouth of the press and the upper belt 40 encloses the upper side of the mat to aid in advancing it into the pressing chamber. At the press entrance, a series of rolls 42 are adjusted so that the fiber may be subjected to an initial compacting pressure ranging up to 700 pounds per square inch. Of course, as will be noted by referring to Figure 5, the rolls 42 are vertically adjustable so that the pressure applied to the fibrous mat may be varied, depending upon the density of the board desired or required. The opposing steel belts 34 and 40, which hold the fiber-resin mat firmly in place, are preferably made of Swedish bandsaw steel or stainless steel and stretched tight by means of the rolls 44 that are located at the exit end of press 38. Rolls 44 in this case are adjustable by means of a motor, although it is obvious that other adjusting means can just as readily be utilized. Each of the steel belts, the use of which insures a smooth surface on the product, has a pair of cleaning brushes 48 disposed to clean the surfaces thereof.

With the mat firmly positioned between belts 34 and 40, pressure and heat are applied to the back side of the upper and lower belts by hot, compressed air coming through small holes 50 in the hollow cast machined platens 52 (see Figure 5).

Turning now to Figures 2 and 3, it will be noted that platents 52 are adjustably mounted by means of bolts 49, nuts 51 and springs 53 which act only to keep the platens separated to facilitate entry of the initial charge into the press.

Referring to Figures 2 and 5, numeral 54 indicates a manifold which feeds steam to the platens while numeral 56 designates the manifold which feeds compressed air to the platens. It will be noted that the air and steam manifolds are coaxially mounted in order that the steam contained within the manifold 54 will preheat the compressed air contained within manifold 56 prior to the time that it enters manifold-like chambers 58 in platens 52. Chambers 58 extend the complete width of the platen, thereby dividing the platen into separate sections. Therefore, since each chamber 58 has a steam-containing section 60 on each side thereof, it is obvious that air entering chamber 58 is heated until its passage from the platen through holes 50. Each steam-containing section 60 is provided with an outlet tube 62 (Figures 2 and 3), this tube extending outwardly from the side of the platen into a collector manifold 64 for the discharge of low quality steam and condensate. Thus, there is a continual passage of steam through the platen to insure that a constant source of heat is available to heat the fibrous material being passed through the press.

When the compressed air exits through holes 50 and impinges against the back side of the steel belts, it is able to impart a great deal of heat to the belt and consequently the material contained therebetween. It will be noted that holes are counterbores, as at 66. This has been done to minimize pressure drop due to fluid expansion which would also cause an undesirable drop of temperature. Additionally, the counterboring permits the highest ratio of average pressure on the belts to the pressure supply. The side of holes 50 and the amount of pressure of the compressed air are calculated to maintain a space 68 of approximately .001 inch between the platens and the belts 34 and 40. Since the compressed air introduced through holes 50 escapes along the edges of the belts, the pressure will drop approximately 30 to 50% at the extreme edge. Additionally, the temperature which is uniform at all places on the belts, will be slightly lower at the edge where the drop in pressure and the sudden expansion upon escape will cause considerable cooling. The best precaution against non-uniform pressure and edge cooling of this nature is by maintaining space 68 at a depth of .001 inch or less. Although the air space 68 normally keeps friction between the relatively moving parts at a minimum, it is not unusual for fibers to become so grouped that high spots are occasionally formed. Such spots, of course, cause the belt to be slightly elevated or depressed and perhaps to make contact with the platens. Therefore, it is preferable that a metal stearate powder be applied to the belt to supply additional lubricating means to protect the platens and belts against the harmful effects of friction when these two members come into contact in the region of the previously mentioned high spots. Application of metal stearate also serves to prevent gumming by stray resin extruded from the mat during compression thereof.

Due to the fact that moisture contained within the fibers is changed to steam during the early part of the pressing operation, a predetermined number of platens near the end of the pressing chamber 70 are supplied with a continuous flow of a liquid cooling agent such as water, so that the air striking the belts 34 and 40 will cool the board to a temperature below the boiling point of water and condense the steam. Cooling of the pressed fibers prior to the time that the board is released from the press is essential to prevent the contained steam pressure from destroying the board.

The cooling means is supplied to the platens in the same manner as the heating means previously described. Instead of steam flowing through manifold 54, water is substituted so that the air contained within the manifold 56 will be cooled rather than heated. Also, steam-containing chambers 60 now in reality become water-containing chambers. Obviously, since the present process is a continuous one, the hot and cold air supplying conduits must be separate and distinct. Therefore, the heat supplying manifolds extend along a predetermined length, for example, two-thirds of its length, and there sealed off. The coolant containing conduits then extend the remainder of the length of the press; that is, the remaining one-third. This is illustrated in Figure 6 in connection with a slightly modified apparatus where heating and cooling manifolds 122 and 128, to be later described, are shown with their sealed ends longitudinally spaced. A similar arrangement is evidenced in the collector manifolds that remove the spent heating and cooling means from the platens; that is to say, separate manifolds are provided for removing the spent heating steam and the spent cooling water.

Considering now a specific example of the general process outlined above, hopper 10 is charged with wood waste, including slabs, mill ends, bark and shavings, and run through pulpers 12. Following the pulping operation the now fibrous material is dried in a rotary dryer until the moisture content is lowered to 10 to 12%, then forwarded to the resinating chamber 26 where approximately 88 parts of hot wood fiber are mixed with 12 parts of liquid resin binder by weight. The resin spray comprises a resin-water solution of approximately 80% water and 20% resin. The hot air is separated from the fibrous material which falls into the felter 30 and forms a loose mat on top of the lower belt 34. In entering the press the mat is subjected to a pressure of 700 pounds per square inch by the rolls and is then carried into the pressing chamber between the opposed endless steel belts. The temperature of the platens and air is maintained at approximately 345° F., in combination with a pressure of approximately 75 pounds per square inch, the pressure being applied for a period of approximately 6 minutes. This particular size board is subjected to a blast of cooled air during the last two minutes before leaving the press. Upon leaving the press the board is trimmed and cut into the desired sizes by any one of several means; in this instance, flying saws are used.

Figure 8:
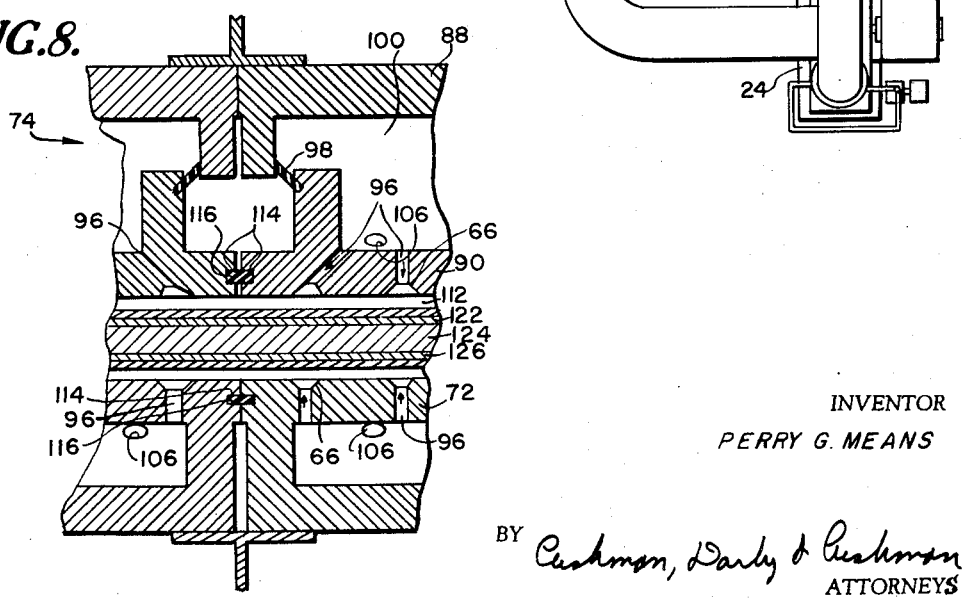
Figure 8 is an enlarged fragmentary view of the encircled area of Figure 6 showing the manner in which the platens are joined.

A modification of the pressing apparatus and platens previously described is illustrated in Figures 6, 7 and 8, the modified apparatus being used primarily in the production of sheet lumber such as plywood. Referring specifically to Figure 7, a pressing chamber 70 is defined by a series of lower platens 72 and a series of upper floating platens which are designated generally by numeral 74. A pair of opposed rolls 76 is provided at the intake end of the pressing chamber and another pair of opposed rolls 78 at the exit end of the pressing chamber. These rolls are used primarily as the mounting means for the opposed endless steel belts 80 and 82, although they will also exert some vertical pressure on the lumber. Each of the belts is provided with a tensioning roll 84 and a pair of cleaning brushes 86.

The structure of the series of upper platens 74, which are used in the plywood press, is materially different from those previously described and will now be described in detail. Referring to Figure 7, it will be seen that each platen 74 comprises an upper section 88 and a lower section 90, which is slidably mounted within said upper section. Section 88 is mounted upon vertical rods 92 and may be adjusted by changing the position of nuts 94. The lower section 90 has a plurality of openings 96 which permit the escape of compressed air from the platen interior onto the rear face of the endless belt. It will be noted that these openings, or holes, are counter-bored in the same manner as the holes in the platens of the fiber board press. Since sections 88 and 90 are movable with respect to each other, section 90 is provided with a sealing gasket 98 (see Figures 7 and 8) that extends completely around this member to prevent the escape of compressed air from the platen into the atmosphere other than by the prescribed means, i.e., the openings in the platen. Thus it will be seen that the two platen sections combine to define a hollow chamber 100, the volume of which is variable.

Steam and hot compressed air are supplied to the platens through a pair of coaxial manifolds 102 and 104, respectively, the compressed air being partially heated by the steam during its passage through manifold 102. The steam is led from manifold 104 into heat radiating conduits 106 that are contained within the platen bodies. Thus the air which is preheated to some extent within the manifold 102 is led from the manifold 102 into smaller pipes 108 and 110, these pipes discharging their contents into the interiors of the platens where it is heated even higher by its passage over the heat radiating conduits 106. This air flows through bores 96 in both upper and lower platen assemblies and provides lubricating layers, indicated in greatly enlarged thickness in Figure 8 at 112.

In view of the fact that the platens in the modified arrangement are sectional, to prevent the air which forms the lubricating layer 112 between the platen and the upper metallic belt 80 from escaping between the platens, each platen has a groove 114 which mates with a similar groove in the adjacent platen, the two grooves jointly forming a recess into which a sealing gasket 116 may be inserted. This sealing arrangement is shown in Figures 7 and 8.

Referring to Figure 7, it will be noted that the press is provided with a longitudinally extending collector manifold 118. The purpose of this manifold is to collect the steam and condensate as it is discharged from the outgoing end of heat-radiating conduits 106. Each platen has a pipe 120 extending from the exit end of its radiating conduit into the collector manifold. The position of collector manifold 118 can be clearly seen in Figure 6.

Considering now the operation of this modified press, several plies of wood veneer are placed on the other with a suitable bonding agent between each of the plies. This is best illustrated in Figure 8 where the compound piece of sheet lumber, which comprises three veneer layers 122, 124 and 126, is shown extending through the pressing apparatus. Upon entering the pressing chamber, the compound composite board is subjected to heat and pressure by the platens and the compressed air passing therethrough. It will be noted that since the upper platens effectively float on top of the composite board, with only the metal belt and the thin layer of lubricating air separating the two, the platens are much more capable of compensating for surface irregularities present in the board. This means that the entire surface will have a uniform pressure acting upon it, thus insuring a uniform bond between the various layers. In this type of platen arrangement, it is not likely that the belt will come into contact with the platen structure, since irregularities in the board will cause an increase in pressure which causes the lower section 90 to recede slightly into the upper section 88 of the platen. The lubricating layer of air 112 may be seen in greatly exaggerated thickness in Figure 8. In this apparatus, as was the case with the preceding apparatus, the last few platens are provided with means whereby the platens and the steel belts may be cooled in order that all steam in the interior of the plywood may be condensed, to relieve the internal pressure in the board.

The above-mentioned cooling system may be clearly seen by referring to Figures 6 and 7. Turning first to Figure 6, an air delivery manifold 128 is positioned adjacent the press in the same manner as that previously described in connection with the heating end of the press. Manifold 128 contains an internally disposed, coaxially mounted manifold 130 for supplying water to the platens. The water flows from manifold 130 upwardly through pipe 132 into cooling conduits that direct the water through the platen. The cooling conduits are identical to the heat radiating means previously described in connection with the heating end of the press. With this arrangement, it is readily apparent that the air contained within manifold 128 and passing into the platen bodies through pipe 134 will be cooled both by contact with manifold 130 and by passage over the cooling pipe 134 prior to its escape through holes 96. After the water has flowed through cooling pipe 134, it leaves the platens through pipes 136 and flows into a collector manifold 138. The water may then be disposed of or cooled and recirculated, whichever is deemed preferable.

It thus will be seen that the objects of this invention have been fully and effectively accomplished. It will be realized, however, that the foregoing specification embodiment has been described only for the purpose of illustrating the principles of this invention and is subject to extensive change without departure from such principles. Therefore, this invention includes all modifications encompassed within the scope of the following claims.

I claim:

1. In a continuous pressing machine, a pair of solid and continuously movable, opposed endless belts forming an elongated pressing chamber therebetween, platens positioned adjacent the inner sides of said belts, means operatively associated with said platens for exerting an inward force on said belts in the region of the pressing chamber, said means including a plurality of openings being formed in said platens for passage of pressurized fluid therethrough, said openings being arranged to direct such fluid against said belts to form a lubricating layer separating said platens from said belts to reduce the friction therebetween.

2. The structure defined in claim 1 wherein said lubricating layer is gaseous.

3. The structure defined in claim 2 wherein the height of said gaseous layer is not greater than .001 inch.

4. The structure defined in claim 2 in which said gaseous layer consists essentially of high pressure air.

5. In a continuous pressing machine, a pair of solid and continuously movable, opposed endless belts forming an elongated pressing chamber therebetween, a series of platens positioned adjacent the inner sides of each of said belts, means operatively associated with said platens for exerting an inward force on said belts in the region of the pressing chamber, the platens of one of said series comprising an upper and a lower section, said lower section being slidably mounted in said upper section, and wherein said means includes a plurality of openings in said lower platen section and means for passing pressurized gas through said openings and against said belts to provide a gaseous lubricating means separating said series of platens from said belts to reduce the friction therebetween.

6. A platen for use in a continuous pressing machine, said platen comprising an upper section, said upper section being adjustably secured to the pressing machine and a lower section, said lower section being slidably mounted in said upper section, said upper and lower sections together defining a hollow chamber, the volume of said chamber varying with movement of said lower section as said lower section moves due to irregularities present in the surface passing thereunder, said upper section being provided with inlet means for the introduction of fluid into said hollow chamber, and said lower section having perforations in its bottom face for the escape of fluid from said hollow chamber.

7. The structure defined in claim 6, said platen having heating means disposed therein.

References Cited in the file of this patent

UNITED STATES PATENTS

| | | |
|---|---|---|
| 1,877,047 | Piazza | Sept. 13, 1932 |
| 2,096,338 | Randall | Oct. 19, 1937 |
| 2,562,135 | Strobel | July 24, 1951 |
| 2,595,964 | Lovell | May 6, 1952 |
| 2,673,370 | Goss | Mar. 30, 1954 |
| 2,779,969 | Bose | Feb. 5, 1957 |

FOREIGN PATENTS

| | | |
|---|---|---|
| 502,286 | Belgium | Oct. 1, 1951 |